April 24, 1962 H. P. MEISSNER 3,031,293
IRON ORE REDUCTION PROCESS IN A FLUIDIZED BED
Filed Jan. 8, 1959 2 Sheets-Sheet 2
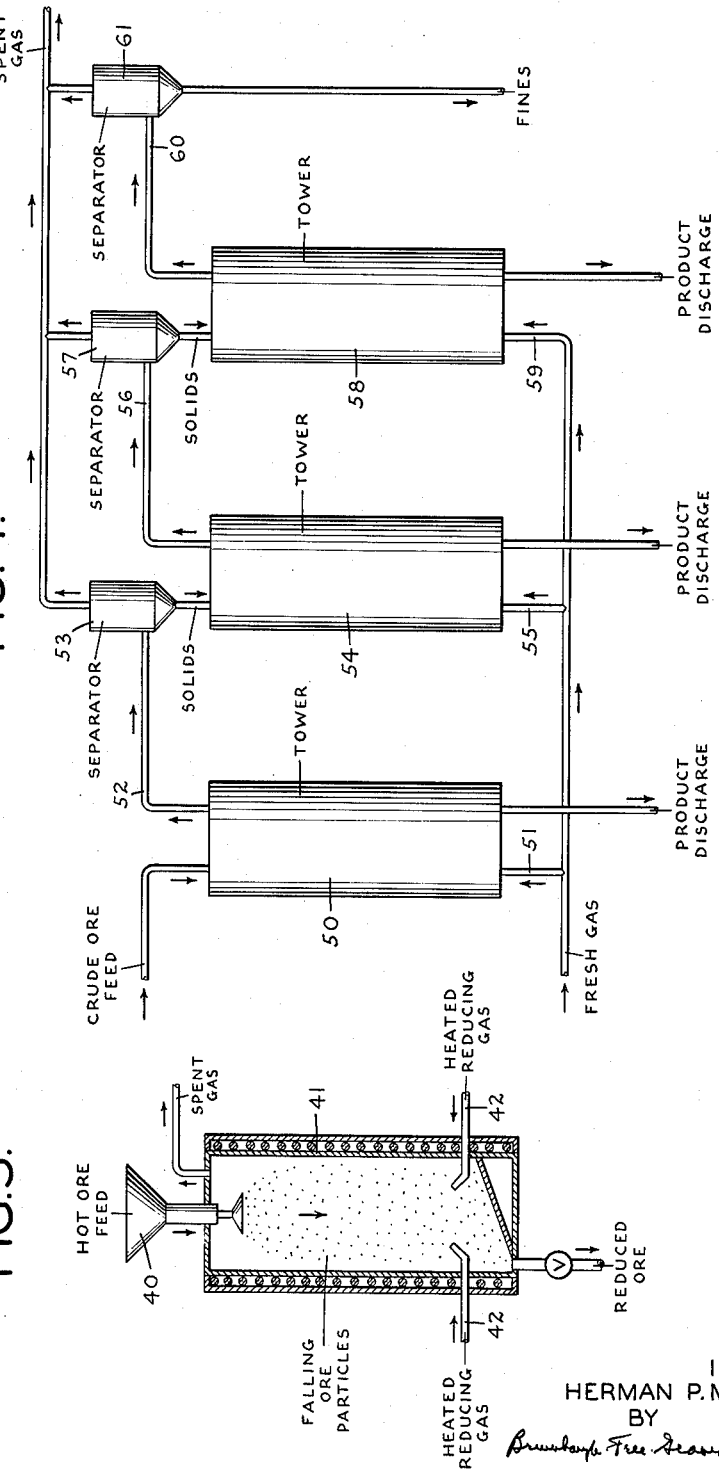
INVENTOR
HERMAN P. MEISSNER
BY
HIS ATTORNEYS

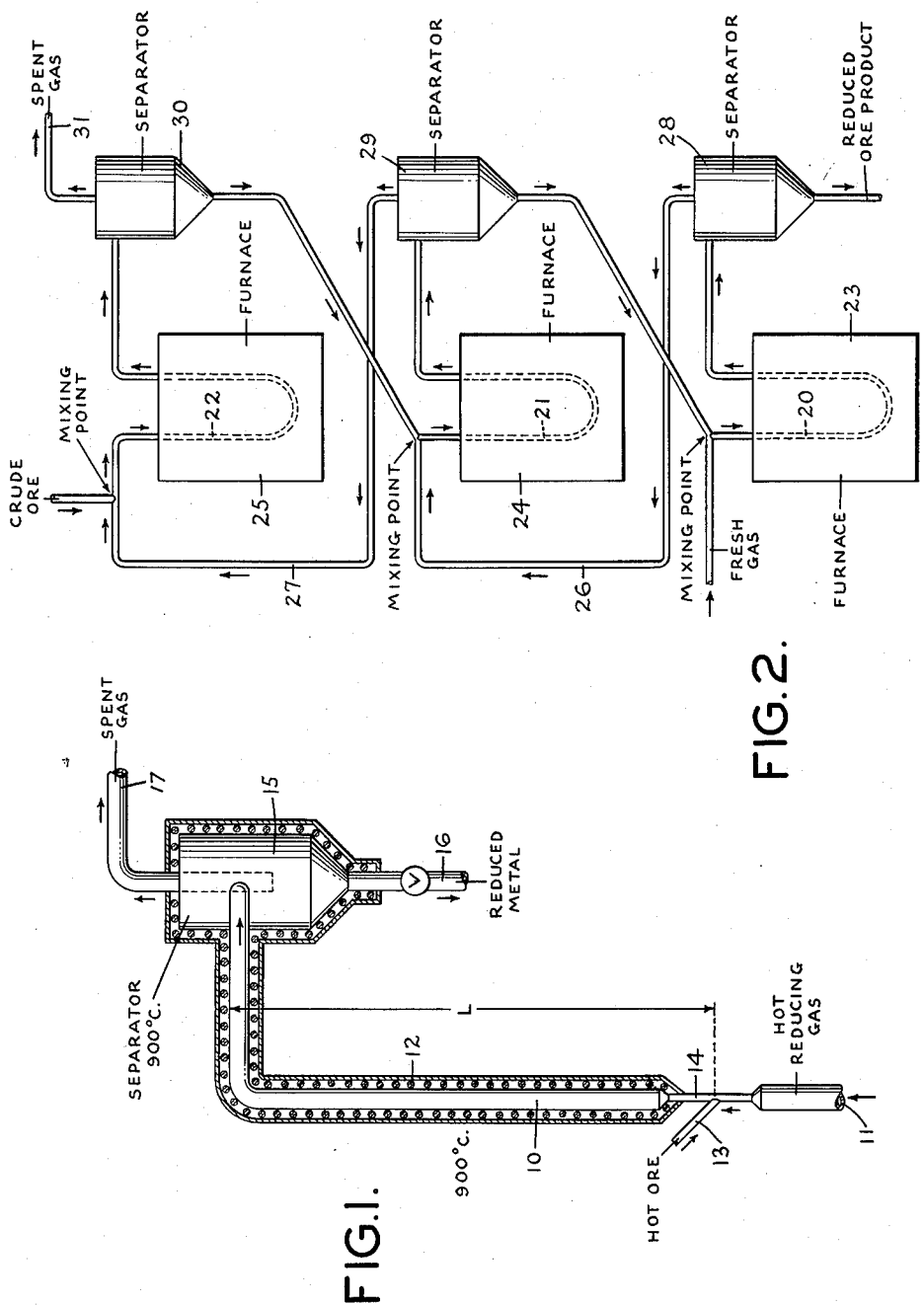

United States Patent Office 3,031,293
Patented Apr. 24, 1962

3,031,293
IRON ORE REDUCTION PROCESS IN A FLUIDIZED BED
Herman P. Meissner, Winchester, Mass., assignor to Arthur D. Little, Inc., Cambridge, Mass., a corporation of Massachusetts
Filed Jan. 8, 1959, Ser. No. 785,639
3 Claims. (Cl. 75—26)

This invention relates to processes and apparatuses for reacting gases with solids or treating solids with gases, and more particularly, to the beneficiation of ores, conversion of aluminum hydroxide to alpha alumina, titanium hydroxide to titania, limestone to lime, dolomite to magnesium oxide, and the like.

Many solids, such as iron ores, are available in a form which renders them unsuitable for beneficiation by conventional methods. For example, some iron ores are available only in a relatively finely divided state and cannot be reduced in a blast furnace without costly and time-consuming pretreatment. Similarly, some sulfide ore may occur in such a physical state that it is difficult to oxidize with conventional apparatus.

It has been suggested, heretofore, that direct reduction of finely divided iron ore can be accomplished by fluidizing operations wherein a reducing gas is introduced into a bed of finely divided ore particles under such pressure and velocity conditions that the ore particles are suspended in the gas to render the bed of solid particles fluent much after the fashion of a liquid while the particles are undergoing reduction. In such operations, best results are obtained when the solid particles are of generally uniform size. When dust-like fumes are present, substantial losses occur due to removal of the dust with the spent gases. Moreover, the smaller particles are reduced much more quickly than the larger particles and in some instances may reduce the fluidity of the bed by softening and agglomerating at the temperature maintained in the reducing zone.

In accordance with the present invention, processes and apparatus are provided in which a finely divided solid or mixture of solids of varying sizes and the gas to be reacted are brought together into intimate contact under conditions which promote the reaction between the gas and solid.

More particularly, in accordance with the invention, finely divided particles of solids of kinds and sizes that cannot be treated readily in fluid bed operations are introduced into a flowing column of gas confined in a duct so that the gas is in intimate contact with the solid particles for a sufficient period of time and under suitable conditions of temperature and pressure to assure substantial or complete beneficiation or treatment of the solid.

In accordance with one form of the invention, the gas is caused to flow at such rate that the finely divided particles are suspended and transported by the gas for a time sufficient to react partially or completely with the gas. The reaction can be conducted in a series of stages in which the gas may be utilized repeatedly and in countercurrent flow to enable a maximum beneficiation of the solid and economical use of the gas. The treatment of the solids may be completed in the gaseous stream or, if necessary, may be completed in other apparatus of appropriate type.

In accordance with another form of the invention, the gas may be caused to flow at a lower rate than that necessary to suspend the particles and transport them along the duct so that at least some of the particles fall slowly through a rising column of the gas and are delayed in their passage therethrough for a sufficient time to enable substantial or complete beneficiation or treatment thereof. If desired, the larger particles can be separated to form a fluidized bed in which fresh gas further beneficiates the solid particles. An operation of the type referred to can be conducted in a series of stages utilizing different gas velocities in the different stages so that reaction, classification and separation of the solids, depending upon particle size or weight, can be accomplished, those particles of larger size being subjected to additional treatment so that all particles are treated substantially to the same extent.

By beneficiating the solids by reaction with gases in the manner described above, solid reducing agents as, for example, the coke used in the reducing of iron ores, are not required and quite simple apparatus can be used as compared with the apparatuses or systems used heretofore.

For a better understanding of the present invention, reference may be had to the accompanying drawing in which:

FIGURE 1 is an elevational and partial sectional view of one form of apparatus for practicing the invention in which the product is transported by the gaseous reagent during the treatment thereof;

FIGURE 2 is a schematic showing of a modified form of apparatus in which the solid is treated in several stages by countercurrent flow of gas;

FIGURE 3 is an elevational and partial sectional view of an apparatus embodying the present invention in which the ore is treated while falling through a rising column of reagent gas; and FIGURE 4 is a schematic view of a multi-stage apparatus for treating a solid having particles of wide range and sizes therein and in which the particles are treated during downward movement through rising columns of reagent gases.

The invention will be described with relation to the treatment of a selected group of solids including iron oxides, aluminum hydroxide, limestone and dolomite, although the invention is not limited to the treatment of these solids.

It is recognized that reducing gases such as CO and $H_2$ will reduce iron oxides to metallic iron over a relatively wide range of temperatures. From the viewpoint of equilibrium, these reduction reactions are not affected by pressure. This is clear from the nature of a reduction reaction which proceeds stagewise, in the case of CO, as follows:

(1) $CO + 3Fe_2O_3 = CO_2 + 2Fe_3O_4$
(2) $CO + Fe_3O_4 = 3FeO + CO_2$
(3) $CO + FeO = Fe + CO_2$

The reaction with hydrogen is similar, as follows:

(4) $H_2 + 3Fe_2O_3 = 2Fe_3O_4 + H_2O$
(5) $H_2 + 3Fe_3O_4 = FeO + H_2O$
(6) $H_2 + FeO = Fe + H_2O$

The fact that there is no change in the number of mols of gas participating in these reactions indicates the insensitivity of the reaction to pressure. It is, of course, recognized that the above reactions do not go to completion at normal industrial operating temperatures. For example, the equilibrium constant for Reaction 3, namely $P_{CO_2}/P_{CO}$, has a value of about 0.35 at 1093° C. and 0.5 at 843° C. Similarly, the equilibrium constant for Reaction 6, namely $P_{H_2O}/P_{H_2}$ has values, respectively, of about 0.7 and 0.5 at these two temperatures.

The reaction rates between iron ore and mixtures of hydrogen and carbon monoxide, with or without nitrogen as a diluting gas, are rapid and increase greatly with reduction of particle size. The hydrogen reaction is somewhat endothermal, while the carbon monoxide reduction is exothermal. Therefore, a mixture of hydrogen and carbon monoxide can be produced for reducing iron ore with a zero heat of reaction although the use of such a mixture is not essential to the operation. Either $H_2$ or CO can be used, if desired. However, such a gas mixture permits a more accurate control of temperatures in a reducing zone. In this way, temperatures may be maintained low enough in the reduction zone to avoid sticking or agglomeration of the particles and, at the same time, high enough to promote reduction of the ore.

Generally, in reducing iron ore according to the present invention, a mixture of hydrogen with carbon monoxide and nitrogen is introduced into a duct at one end or adjacent to one end of the duct. For example, the gas is introduced into the duct 10 shown in FIGURE 1, through a port 11 in the lower end of the duct. The gas is heated to a desired temperature between about 700° C. and about 900° C., and appropriate heating means such as electric heating units 12, are provided around the outside of the duct 10 in order to maintain a uniform and relatively closely controlled heating temperature within the duct. External heating is not essential inasmuch as the system may be operated adiabatically under certain conditions. Finely divided iron ore also at a temperature in a range between about 700° C. and 900° C. is introduced continuously from a chute or hopper, not shown, through a downwardly extending passage 13 into a restricted Venturi portion 14 of the duct where the heated particles are carried upwardly along the duct 10 by the reducing gas and are discharged into a cyclone type separator 15 which may also be provided with heating units to maintain it at a temperature sufficiently high to continue the reaction between the gas and ore particles in the separator. The reduced or partially reduced product is discharged through the discharge tube 16 of the separator while the spent gas leaves through the vent pipe 17 of the separator. The reduced or partially reduced product may be cooled in an atmosphere of inert gas, or as disclosed in FIGURE 2, it may be subjected to a further reduction to produce a highly metallized product. Thus, as shown in FIGURE 2, an apparatus is provided in which iron ore or other solid is treated in a series of stages including, as shown, three interconnected U-shaped reaction ducts 20, 21 and 22, each of these ducts being housed in furnace or heating chambers 23, 24 and 25, respectively, whereby a desired temperature may be maintained in the ducts. As indicated previously, the apparatus may be operated adiabatically or heat transfer may be minimized by providing insulating jackets on the ducts. Interposed in the pipes 26 and 27 between the ducts 20 and 21 and the ducts 21 and 22 are separators 28 and 29 for separating solids from the gases. A third separator 30 is connected to the outlet end of duct 22. Solids collected in the separator 30 are supplied to the feed end of the duct 21 for transport therethrough into the separator 29. Solids collected in the separator 29 are supplied to the feed end of the duct 20 and are carried therethrough to the separator 28 from which they are discharged from the apparatus. In operation, ore is introduced into the pipe 27 and is transported along and partially reduced in the reducing duct 22 which is heated to a desired temperature between about 700° C. and 900° C. Gas is admitted into the duct 20 and flows through it, separator 28, pipe 26, reaction duct 21, separator 29, pipe 27, reaction duct 22, separator 30 and out through vent 31. The ore which is partially reduced in the duct 22 is separated from the gas by means of the separator 30 and is introduced into the inlet or upstream end of the reduction duct 21. The further reduced material discharged from the duct 21 is separated from the gas by means of the separator 29 and is introduced into the upstream or inlet end of the duct 20. The solids discharged from the duct 20 are separated from the gas by means of the separator 28 and are cooled or treated as may be required.

It will be apparent that the above described operation is essentially a staged countercurrent flow reaction in which the reaction between solid and gas takes place in a parallel flow stage but gases and solid particles travel in counterflow relation between stages.

The inclination of the reaction ducts may be varied as desired and the gas may be used to transport the solids along horizontal, vertical or inclined paths, as indicated in FIGURE 2. Moreover, if desired, fresh gas, or different gases may be introduced between the several stages of the treatment so that a plurality of reactions can take place during transport of the material through the apparatus.

A most intimate contact between the gas and particles is assured by the flow of gas around the particles and, moreover, reduction may be facilitated by attrition of the particles. Little or no sticking or agglommeration of the particles can occur at the relatively low temperature of the reducing operation and when a gas is used which neither heats nor cools the ore appreciably during the reaction, the temperature in the reaction zones can be controlled accurately.

*Example 1*

As indicated above, the iron ore can be reduced at a temperature within a range of about 700° C. to 900° C. with an appropriate mixture of carbon monoxide, hydrogen and inert gas. By way of a typical example, a hematite ore (64% iron, 200 mesh) is introduced into the duct 10 while gas composed of about equal parts of hydrogen and carbon monoxide is introduced into the lower end of the duct to produce a flow rate of about 9 feet per second. The duct is about 3 feet long and is maintained at a temperature of 845° C. The gas and ore are preheated to about the same temperature prior to entry into the duct. Inasmuch as the gas flow rate in the duct is 9 feet per second, the gas residence time in the duct is ⅓ second. By feeding the gas at a ratio of about 5 pound mol hydrogen to one pound atom of iron the product recovered from the separator 14 is about 71% metallized.

When the same conditions are present but the ratio of solids to gas is modified such that 3 pound mol hydrogen is used for each pound atom of iron, the product obtained is largely $Fe_3O_4$.

*Example 2*

A preheated gas mixture containing 40% $H_2$, 40% $N_2$ and 20% CO is introduced into the inlet 11 of the duct 10 which in the form utilized has an inside diameter of 3 inches and a length of 6 feet. The duct was maintained at about 800° C. throughout its length by use of external electric heaters disposed around the tube. A hot gas velocity of 10 feet per second was maintained in the duct.

A Venezuelan iron ore analyzing about 65% iron and having a particle size of 100 to 325 mesh was introduced into the hot reducing gases near the lower end of the duct. The ore was fed continuously and the solid particles were transported with the gas through the duct and removed in the heated separator connected to the end of the duct, as shown in FIGURE 1. Analysis of product discharged from the separator indicated that 53% of the iron in the product was reduced to a metallic state in this operation. The partially reduced ore can be reduced further by fluid bed reduction or electric arc furnace or by briquetting and treating in a blast furnace or the like.

*Example 3*

Finely divided limestone was fed by means of a vibrating screw feeder into a preheat zone consisting of a vertical pipe 9 ft. in length in which it was preheated prior to entrance into the base of the transport tube. Upon entering the vertical transport tube it met a rising preheated gas stream of sufficient velocity to carry it upwards in the tube. The solids, just after mixing with the air while being transported passed through a zone containing a flame formed by introducing natural gas co-axially into the stream in which it was ignited by auto ignition. The air-gas ratio was adjusted to obtain the highest temperature of the exhaust gases at the cyclone outlet of the transport tube. The solids, which had been carried by air, were then carried by the combustion gases up through the heated six-foot tube into a cyclone where they were dropped out of the gas stream. About 90% of the limestone was converted to lime.

A similar test was conducted with the duct in a horizontal position and gave similar results.

Reaction during transportation of a solid in a gaseous stream is not limited to iron oxides. For example, aluminum hydroxide can be dehydrated and dolomite converted to MgO by heated gases while moving with the gas stream.

It will be understood that by utilizing a multi-stage operation, much higher feed rates and more compact equipment can be used and that the reactions can be carried to or almost to completion by such operations.

Thus while aluminum hydroxide cannot be completely converted to alpha alumina in a single stage, alpha alumina can be produced by the use of higher temperatures in a multi-stage operation.

*Example 4*

As in Example 2, a gas mixture containing 40% $H_2$, 40% $N_2$ and 20% CO is introduced as fresh gas into duct 20 of an apparatus like that shown in FIG. 2. Preheated Venezuelan iron ore analyzing 65% iron and having a particle size of 100-325 mesh was introduced into the feed end of the duct 22. The ore and gas are fed continuously, and are passed through the three stages as shown. All operations are kept reasonably close to 850° C. The solid products discharged from separators 30, 29 and 28 respectively, show 2%, 50% and 85% of the total iron present as metallic iron. Reducing gas consumption in this case is about 25% less than in Example 1, in which only a single stage contact was employed.

In another form of the invention illustrated in FIGURES 3 and 4, similar results are attained but the operating conditions are somewhat modified. Thus, as shown in FIGURE 3, ore can be reduced and gases and solids can be reacted by discharging the solids by means of a hopper or other feeding means 40 into the upper end of a reducing duct 41, while heated reducing gases are introduced through one or more inlets 42 at the bottom of the duct 41. The gas velocity in the reducing duct 41 is insufficient to suspend or transport the solid particles but it is high enough to slow their descent for a sufficient period of time to enable the gas to react at least partially with the particles. For example, solid particles of 14 and 150 mesh have a free fall velocity of 75 and 3 feet per second, respectively. In each case, the rising gas velocity would be less to allow the particles to fall. The height of the duct 41 is, of course, great enough to allow sufficient residence time of the solids for the desired reaction to occur. For example, assuming a 14 mesh iron ore particle needs 2 seconds' exposure for satisfactory reduction, if the rising gas velocity is 50 feet per second, then the particles will fall 25 feet per second (inasmuch as in free fall it moves at 75 feet per second). In other words, for two seconds of contact time, a duct 50 feet high is required. In this process, as in the processes described above, a reducing gas, such as hydrogen, carbon monoxide, methane or mixtures thereof with or without inert gases can be used.

The process can be conducted in a series of stages, which is particularly advantageous when treating products of widely varying particle size. As shown in FIGURE 4, heated iron ore containing a wide particle size variation is fed in at the top of a duct or tower 50 having external heating means (not shown) while hot gas is fed in through the inlet 51. The gas flows up the duct 50 at 50 feet per second so that only the largest and heaviest particles, namely, those whose velocity of falling speed exceeds 50 feet per second can fall down through the duct 50. The spent gas from the duct 50 carrying the finer and lighter solids is discharged through the pipe 52 into the separator 53 from which the solids are discharged into a second reducing duct or tower 54. The speed of the gas entering the inlet 55 and flowing up the duct is approximately 15 feet per second. Here again those particles whose free fall rate is greater than 15 feet per second and those particles whose free fall velocity is less than 15 feet per second are separated. The heavier and larger particles fall through and are reduced by the rising gas stream, while the lighter particles are carried off through the passage 56 into the separator 57 where the spent gases are discharged and the solids are introduced into a reducing duct 58. Reducing gas is introduced through the inlet 59 into the duct 58 at such a rate that a gas velocity of about 3 feet per second is maintained in the duct 58. This is insufficient to discharge any other than the finest particles so that substantially all of the remaining ore is subjected to countercurrent reduction in the duct 58. Any fines that are discharged with the gas through the passage 60 are separated from the spent gas by means of the separator 61.

The products discharged from each of the towers or ducts 50, 54 and 58 may be subjected to further treatment, for example, by discharging the material into a fluid bed reducing device of well-known type, or by providing in the bottom of each duct a porous hearth through which the reducing gases are introduced for fluidizing the ore falling thereon. Suitable dams or overflow pipes may be provided in such hearths in accordance with the known practice to permit the reduced material to be discharged from the bed. The reaction products collected in the separator 61 and discharged from the bottom of the duct 58 may not require further treatment but such further treatment usually will be required for the products discharged from the bottoms of the ducts 50 and 54.

A typical example of a process of the type described above involving a single stage operation may be conducted as follows:

*Example 5*

A gas mixture analyzing 40% hydrogen, 40% nitrogen and 20% carbon monoxide is preheated to 800° C. and introduced into the lower end of a vertical alloy duct 41 measuring 3 inches in inside diameter and 6 feet long. The tube is maintained at a temperature throughout of 800° C. by the use of electric heaters external to the tube. The velocity of the hot gases is 2 feet per second upwardly through the tube.

Venezuelan iron ore analyzing about 65% iron and having a particle size of from 100 to 325 mesh is introduced continuously and at a steady rate into the top of the tube for free fall through the tube counter to the ascending gas. A valve in the lower end of the tube allows the product to be withdrawn from the bottom of the tube without allowing the gas to escape. The solid product removed from the bottom of the tube is 70% metallized.

It will be understood, of course, that the dimensions of the reaction ducts in each of the above-described apparatuses can be modified depending upon the desired production or treating rate and the composition of the reducing gases, and the particle sizes of the ores can be modified as the purpose demands. Moreover, fully or partially reacted or beneficiated products resulting from the processes described above can be subjected to further treatment. Thus compacts or slugs may be formed by compressing the reduced or partially reduced ore to enable it to be further refined, as for example, in a blast furnace. Partially reduced ores may be fed directly into an electric furnace without compression or compaction. As indicated above, the process is not limited to the reduction of oxides but it can be used equally well in the oxidation reactions and in the treatment of solids with gases of various types.

Therefore, the apparatus and the examples of the process disclosed herein should be considered as illustrative.

I claim:
1. A process for reducing metallic oxides to metal comprising discharging a mixture of solid particles of a metallic oxide of different particle sizes downwardly into a rising column of a reducing gas maintained at a temperature and pressure promoting a reaction between the gas and the oxide, controlling the speed of the rising column of gas to entrain the smaller particles with said gas and allow the larger particles to fall through the column for a period of time sufficient to reduce the oxide at least partially to metal, discharging said gas and said entrained smaller particles, separating said smaller particles from said gas and introducing them into the top portion of a different rising column of heated reducing gas having too slow a speed to transport but a high enough speed to retard the fall of said smaller particles and reduce them substantially completely to metal.

2. A process for reducing iron oxides to metallic iron comprising discharging finely-divided iron oxide having particles of different sizes downwardly into a first rising column of reducing gas maintained at a temperature and pressure promoting a reduction of the iron oxide to metallic iron, the velocity of the rising column of gas being high enough to transport the small particles with the said gas and allow the large particles to fall through the column for a period of time sufficient to reduce the oxide at least partially, discharging the gas and entrained small particles from the top of said column, separating the small particles from said discharged gas, introducing said small particles into a second rising column of heated reducing gas to further reduce the particles and having too low a speed to transport all of said small particles but a high enough speed to entrain and transport some of the smallest particles, separating the entrained smallest particles and introducing them into the top of a third rising column of reducing gas to reduce the particles therein substantially completely to metal.

3. The process set forth in claim 2 comprising forming a bed of said large particles, blowing reducing gas through said bed to fluidize it and reduce said large particles substantially completely to metallic iron.

References Cited in the file of this patent
UNITED STATES PATENTS

| | | |
|---|---|---|
| 2,399,984 | Caldwell | May 7, 1946 |
| 2,481,217 | Hemminger | Sept. 6, 1949 |
| 2,561,396 | Matheson | July 24, 1951 |
| 2,621,118 | Cyr et al. | Dec. 9, 1952 |
| 2,711,368 | Lewis | June 21, 1955 |
| 2,726,137 | Davis | Dec. 6, 1955 |

UNITED STATES PATENT OFFICE
CERTIFICATE OF CORRECTION

Patent No. 3,031,293                                    April 24, 1962

Herman P. Meissner

It is hereby certified that error appears in the above numbered patent requiring correction and that the said Letters Patent should read as corrected below.

Column 2, line 21, for "gaeous" read --- gaseous ---; column 4, line 41, for "3" read --- 4 ---.

Signed and sealed this 4th day of September 1962.

(SEAL)
Attest:

ERNEST W. SWIDER
Attesting Officer

DAVID L. LADD
Commissioner of Patents